(12) United States Patent
Bala et al.

(10) Patent No.: US 11,508,169 B2
(45) Date of Patent: Nov. 22, 2022

(54) SYSTEM AND METHOD FOR SYNTHETIC IMAGE GENERATION WITH LOCALIZED EDITING

(71) Applicant: Palo Alto Research Center Incorporated, Palo Alto, CA (US)

(72) Inventors: Raja Bala, Pittsford, NY (US); Robert R. Price, Palo Alto, CA (US); Edo Collins, Lausanne (CH)

(73) Assignee: Palo Alto Research Center Incorporated, Palo Alto, CA (US)

( * ) Notice: Subject to any disclaimer, the term of this patent is extended or adjusted under 35 U.S.C. 154(b) by 417 days.

(21) Appl. No.: 16/737,702

(22) Filed: Jan. 8, 2020

(65) Prior Publication Data

US 2021/0209464 A1    Jul. 8, 2021

(51) Int. Cl.
  *G06T 11/60*    (2006.01)
  *G06V 30/262*   (2022.01)
  *G06F 17/16*    (2006.01)
  *G06K 9/62*     (2022.01)

(52) U.S. Cl.
  CPC ............ *G06V 30/274* (2022.01); *G06F 17/16* (2013.01); *G06K 9/6223* (2013.01)

(58) Field of Classification Search
  CPC . G06T 2207/20084; G06T 2207/20081; G06T 2207/10024; G06T 7/0012; G06T 11/00; G06T 7/11; G06T 2207/10032; G06T 11/001; G06T 5/006; G06T 5/50; G06T 7/0004; G06T 7/13; G06T 2207/10028; G06T 2207/20076; G06T 5/001; G06V 10/22; G06V 30/10; G06V 30/1444; G06V 10/462; G06V 10/247; G06V 10/25; G06V 10/28; G06V 10/464; G06V 10/48; G06V 30/18143; G06V 30/18152; G06V 30/40; G06K 9/6255; G06K 9/6228; G06K 9/623; G06K 9/6232
  USPC ........ 382/182, 192, 224, 226, 229, 276, 305
  See application file for complete search history.

(56) References Cited

U.S. PATENT DOCUMENTS

| | | | | |
|---|---|---|---|---|
| 8,896,622 | B2 * | 11/2014 | Winnemoeller | G06T 11/00 |
| | | | | 345/619 |
| 9,105,117 | B2 * | 8/2015 | Asente | G06T 15/00 |
| 9,552,510 | B2 * | 1/2017 | Li | G06V 10/50 |
| 9,665,930 | B1 * | 5/2017 | Bedi | H04L 67/75 |
| 9,799,119 | B2 * | 10/2017 | Cheng | G06V 10/28 |
| 9,940,551 | B1 * | 4/2018 | Mordvintsev | G06V 10/82 |
| 2018/0082715 | A1 * | 3/2018 | Rymkowski | G06V 20/10 |
| 2020/0035350 | A1 * | 1/2020 | Sullivan | G06T 11/001 |
| 2021/0089759 | A1 * | 3/2021 | Todorov | G06K 9/627 |

(Continued)

*Primary Examiner* — Linh V Nguyen
(74) *Attorney, Agent, or Firm* — Shun Yao; Yao Legal Services, Inc.

(57) ABSTRACT

Embodiments described herein provide a system for generating synthetic images with localized editing. During operation, the system obtains a source image and a target image for image synthesis and selects a semantic element from the source image. The semantic element indicates a semantically meaningful part of an object depicted in the source image. The system then determines the style information associated with the source and target images. Subsequently, the system generates a synthetic image by transferring the style of the semantic element from the source image to the target image based on the feature representations. In this way, the system can facilitate localized editing of the target image.

20 Claims, 10 Drawing Sheets

(56) References Cited

U.S. PATENT DOCUMENTS

2021/0174523 A1* 6/2021 Kaethner ............. G06V 10/764
2021/0178274 A1* 6/2021 St-Pierre ................ G06K 9/627

* cited by examiner

SYSTEM AND METHOD FOR SYNTHETIC IMAGE GENERATION WITH LOCALIZED EDITING

BACKGROUND

Field

This disclosure is generally related to the field of artificial intelligence (AI). More specifically, this disclosure is related to a system and method for generating synthetic images with localized customization using an enhanced generative adversarial network (GAN) that incorporates semantic information.

Related Art

The exponential growth of AI-based techniques, such as neural networks, has made them a popular medium for generating synthetic data used in various applications. Generative adversarial networks (GANs) have become popular for generating synthetic data, such as synthetic but realistic images. To do so, a GAN typically includes a generator neural network (which is referred to as a generator) and a discriminator neural network (which is referred to as a discriminator).

The generator may produce synthetic image samples as outputs. The generator can try to improve the quality of the synthetic image samples by "convincing" the discriminator that these images are real images. The discriminator is tasked with distinguishing real image samples from the generated synthetic image samples. The discriminator determines whether an image, as a whole, is real or not. As a result, through multiple iterations, the generator learns to generate a synthetic image that incorporates the statistical properties of a real image.

A GAN can also be used for semantic image editing. For example, a GAN may learn a manifold for natural images in a latent space facilitated by the GAN and performs semantic edits that traverse or lie close to this manifold. The GAN may use auto-encoders to disentangle the image into semantic subspaces and reconstruct the image and facilitate semantic edits along the individual subspaces. Disentanglement indicates that an attribute of interest, which can be considered as a semantically meaningful element of an image, can be manipulated independently of other attributes. Such a GAN can execute some edits that represent changes in color, lighting, pose, facial expression, age, hair appearance, eyewear, and headwear.

While GANs bring many desirable features to synthetic image generation, some issues remain unsolved in facilitating localized customization of a synthetic image generation process.

SUMMARY

Embodiments described herein provide a system for generating synthetic images with localized editing. During operation, the system obtains a source image and a target image for image synthesis and extracts respective feature representations from the source and target images. The system also selects a semantic element from the source image. The semantic element indicates a semantically meaningful part of an object depicted in the source image. The system then determines the style information associated with the source and target images. Subsequently, the system generates a synthetic image by transferring the style of the semantic element from the source image to the target image based on the feature representations. In this way, the system can facilitate the localized editing of the target image.

In a variation on this embodiment, the system obtains a strength of the transfer of the style of the semantic element and transfers the style of the semantic element based on the strength.

In a variation on this embodiment, the synthetic image is generated by a generative adversarial network (GAN), such as a StyleGAN.

In a variation on this embodiment, the system obtains feature vectors as the feature representations associated with the source and target images. The system then generates a set of clusters based on the feature vectors. A respective cluster corresponds to a semantic element of the source image.

In a further variation, the set of clusters are generated based on one or more of: K-means clustering, spherical K-means clustering, and non-negative matrix factorization.

In a further variation, the source and target images are synthetic image generated by a StyleGAN. The feature vectors can then correspond to the embeddings of one or more hidden layers of the StyleGAN.

In a variation on this embodiment, the source and target images are natural images. The system then converts the source and target images to respective StyleGAN representations.

In a variation on this embodiment, transferring the semantic element also includes suppressing the transfer of styles outside of the semantic element from the source image.

In a variation on this embodiment, transferring the style of the semantic element also includes performing style interpolation between the source image and the target image based on a localizing condition matrix associated with the semantic element.

In a variation on this embodiment, the system presenting a user interface capable of obtaining a user input that selects the semantic element from the source image. The user interface can obtain the user input based on one or more of: a selection of the spatial location of the semantic element on the source image and a selection from a catalog of semantic elements.

In a variation on this embodiment, the system can perform the localized editing absent: (i) an explicit or external spatial localization operation, and (ii) an external form of supervision.

BRIEF DESCRIPTION OF THE FIGURES

In the figures, like reference numerals refer to the same figure elements.

DETAILED DESCRIPTION

Figure 1A:
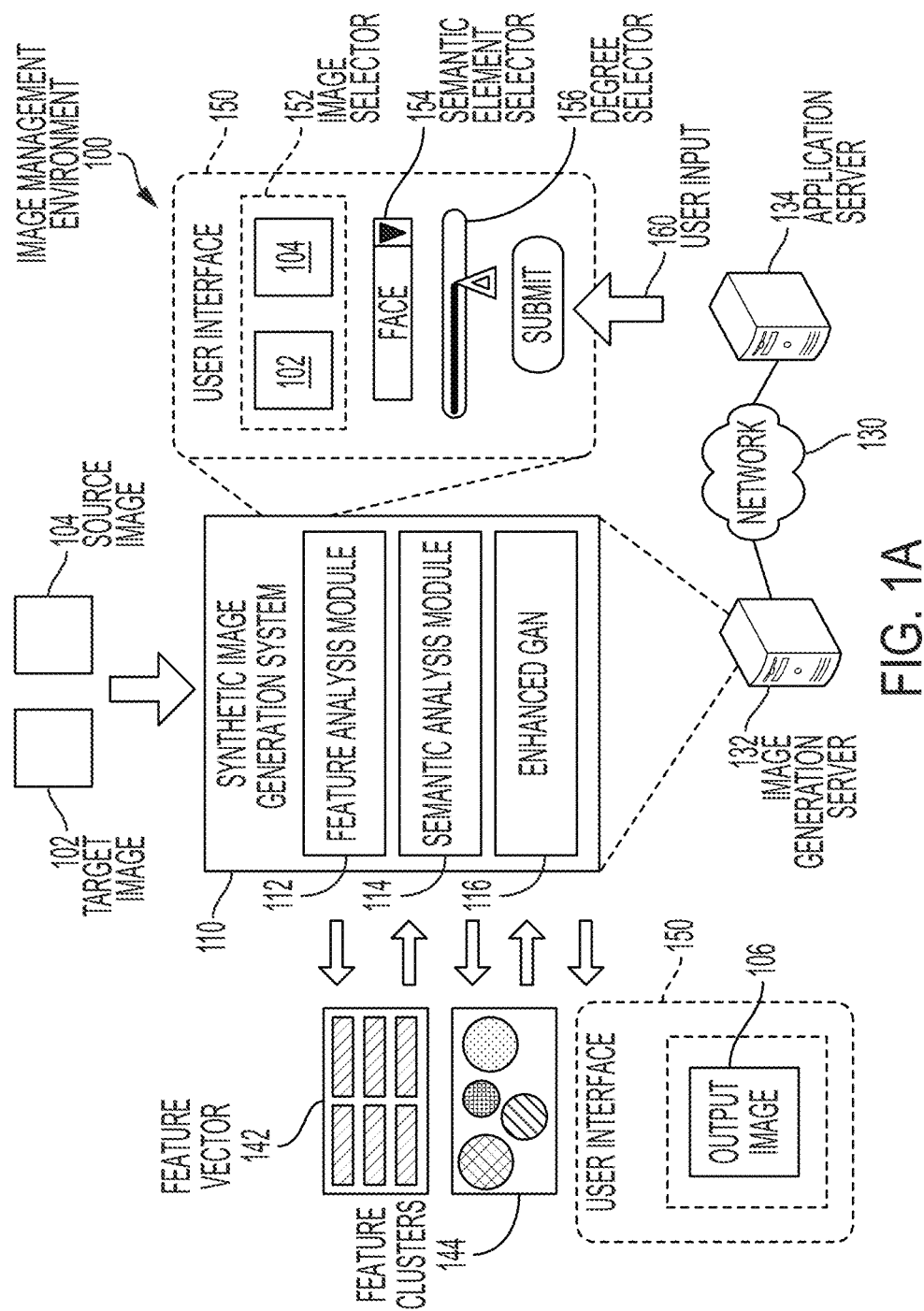
FIG. 1A illustrates an exemplary synthetic image generation system that allows localized customization, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of generating a synthetic image with localized edits by (i) determining semantically meaningful segments of an image using feature clustering; and (ii) incorporating the feature information associated with a semantically meaningful segment into the image synthesis process. The system may use a generative adversarial network (GAN) to generate the synthetic image.

With existing technologies, the exact model a GAN learns while generating a synthetic image may not be apparent. To address this issue, enhanced image GANs, such as Progressive Growing GAN (PG-GAN) and StyleGAN use progressive training to encourage each layer to model the variation exhibited at given image resolutions. Based on the progressive training, the models of these GAN variations often demonstrate disentangled representations of image features. Disentanglement may indicate that an attribute of interest, such as a semantic element of an image (e.g., an eye of a face, a window of a bedroom) can be manipulated independently of other attributes. However, enhanced image GANs usually do not utilize disentanglement to facilitate localized editing during image synthesis.

To solve this problem, embodiments described herein provide an efficient synthetic image generation system that incorporates localized editing during image synthesis based on disentangled semantic information. The system can perform spatially-localized semantic editing on the outputs of GANs. The system can perform the editing by transferring information, specifically the style associated with a semantic element of a source image to a target image. One or both images of source and target images can be real images or synthetic images (e.g., an output of a GAN). Instead of relying on additional datasets and trained networks, or traditional image morphing methods requiring complex spatial operations, the system uses feature vectors of an image (e.g., embeddings of a neural network layer). As a result, the system can utilize semantic representation learned by a GAN.

Unlike existing solutions, the system facilitates a specific form of semantic editing that transfers the style of a semantic element from a source image to a target image. A semantic element of an image can be an image segment that is semantically meaningful within the context of that image. For example, eyes, mouth, and nose can be semantic elements in facial images; and bed, pillow, and windows can be semantic elements in images depicting indoor living scenes. Even though the system receives a pair of images as input parameters, instead of morphing an entire image, the system only transfers a semantic element from the source image to the target image while leaving the remainder of the target image unaltered. This transfer of the semantic element does not require explicit spatial processing, such as warping and compositing (e.g., as required in face-swapping applications). Furthermore, the system can perform localized editing using inherently disentangled structure without external supervision by pre-trained image segmentation models.

During operation, the system can obtain feature information of a source image. The feature information can be represented by a feature vector. The system may obtain the feature vector by applying a generative AI model (e.g., a neural network) on a natural image. On the other hand, if the source image is a synthetic image, the system can obtain the embeddings associated with the hidden layer activations of the image synthesis process. The system can analyze the feature vectors (e.g., the activation tensors of generative models, such as PG-GAN and StyleGAN) and cluster the feature vectors by applying a clustering technique (e.g., spherical k-means clustering). The generated clusters can spatially span coherent semantic elements and sub-elements in images, such as eyes, nose, and mouth for face images, and bed, pillows, and windows for bedroom images.

In some embodiments, the system can present the source image in a user interface that allows the user to select the source and target images (e.g., by browsing the local computing system or from a pre-defined repository). The user can select (e.g., using a pointing device or a touch screen) a semantic element on the source image using the interface. The interface may also present a list of possible semantic elements to be selected (e.g., in a drop-down menu) from which the user may select the semantic element. Since the clusters represent corresponding semantic elements of the source image, the system can select a cluster corresponding to the selected semantic element of the source image. The system can use a GAN (e.g., StyleGAN) to synthesize an image by transferring the style of the selected semantic element from the source image to the target image based on the feature information in the cluster corresponding to the selected semantic element, thereby facilitating localized editing in image synthesis.

Exemplary System

FIG. 1A illustrates an exemplary synthetic image generation system that allows localized customization, in accordance with an embodiment of the present application. In this example, an image management environment 100 includes an application server 134, which can host one or more applications that use synthetic images. Such applications include, but are not limited to, visualization of new interior/industrial designs, new designs for apparel and accessories, and scenes in computer games and animations. An image generation server 132 of environment 100 can generate synthetic images and provide the synthetic images to application server 134. In some embodiments, image generation server 132 communicates with application server 134 via a network 130, which can be a local or a wide area network.

Image generation server 132 can use a GAN to generate synthetic images. With existing technologies, the exact model the GAN of server 132 learns while generating a synthetic image may not be apparent. To address this issue, server 132 can utilize enhanced image GANs, such as PG-GAN and StyleGAN, which use progressive training to encourage each layer to model the variation exhibited at given image resolutions. Based on the progressive training, the models of these GAN variations often demonstrate disentangled representation of image features. However, enhanced image GANs usually do not utilize disentanglement to facilitate localized editing during image synthesis. As a result, server 132 may not be capable of incorporating local and semantic features of a source image 104 with a target image 102.

To solve this problem, an efficient synthetic image generation system 110 can incorporate localized editing during image synthesis based on disentangled semantic information. System 110 can perform spatially-localized semantic editing on the outputs of GANs. System 110 can perform the editing by transferring information, especially the style associated with a semantic element of source image 104 to target image 102. One or both of images 102 and 104 can be real images or synthetic images (e.g., outputs of a GAN). Instead of relying on additional datasets and trained networks, or traditional image morphing methods requiring complex spatial operations, system 110 uses feature vectors of source image 102. The feature vectors allow system 110 to utilize semantic representation in source image 104.

Unlike existing solutions, system 110 facilitates a specific form of semantic editing that transfers the style of a semantic element from source image 104 to target image 102. A semantic element of source image 104 can be an image segment that is semantically meaningful within the context of source image 104. For example, if source image 104 is an image of a face, eyes, mouth, and nose can be semantic elements of source image. Similarly, if source image 104 depicts indoor living scenes, bed, pillow, and windows can be semantic elements in source image 104. Even though system 110 receives a pair of images 102 and 104 as input parameters, instead of morphing image 102, system 110 only transfers a semantic element from source image 104 to target image 102 while leaving the remainder of target image 102 unaltered. This transfer of the semantic element does not require explicit spatial processing, such as warping and compositing. Furthermore, system 110 can perform localized editing using inherently disentangled structure without external supervision by pre-trained image segmentation models.

System 110 can be equipped with a feature analysis module 112, a semantic analysis module 114, and an enhanced GAN 116. During operation, feature analysis module 112 can obtain feature information of source image 104. The feature information can be represented by a set of feature vectors 142. Feature analysis module 112 may obtain feature vectors 142 by applying a generative AI model (e.g., a neural network) on a natural image. On the other hand, if source image 104 is a synthetic image, feature analysis module 112 can obtain the embeddings associated with the hidden layer activations of the image synthesis process as feature vectors 142. Semantic analysis module 114 can analyze feature vectors 142 (e.g., the activation tensors of generative models, such as PG-GAN and StyleGAN) and cluster the feature information in feature vectors 142 to generate a set of feature clusters 144. In some embodiments, semantic analysis module 114 can apply a clustering technique, such as spherical k-means clustering, on feature vectors 142. Generated feature clusters 144 can spatially span coherent semantic elements and sub-elements in source image 104.

In some embodiments, system 110 can present a user interface 150 equipped with an image selector 152, which allows a user to provide a user input 160. User input 160 can be obtained based on a clicking operation of a pointing device or a touching operation on a touch screen. User input 160 includes selecting source image 104 and target image 102. Using image selector 152, the user can select source image 104 and target image 102 from a local storage device, from a distributed storage device (e.g., from the cloud), or from a predefined repository of system 110. Subsequently, the user can select, as a part of user input 160, a semantic element on source image 104 using interface 150. The user may click on a particular element of source image 104 in user interface 150 to select the spatial location of the semantic element on the source image. Based on that click, system 110 can determine which semantic element of source image 104 the user wishes to transfer to target image 102.

Interface 150 may also present a semantic element selector 154 (e.g., a drop-down menu) that may present a catalog of possible semantic elements to be selected from source image 104. System 110 may determine, based on the type of object depicted in source image 104, a set of semantic elements. In some embodiments, system 110 can generate the catalog by labeling each cluster of clusters 144 with a corresponding semantically meaningful label and combining the labels into the catalog. The user may select the semantic element from semantic element selector 154. For example, if source image 104 is an image of a face, the corresponding catalog can include eyes, nose, mouth, and hair as semantic elements of source image 104. Semantic element selector 154 can then list eyes, nose, mouth, and hair as possible elements to be selected from source image 104.

Interface 150 can also include a degree selector 156, which can be a slide-bar, that indicates the degree or strength of transfer of the semantic element. Degree selector 156 may use a scale from 0 to 1, with 0 indicating no change and 1 indicating a strong transfer. Upon obtaining user input 160 (e.g., based on a user submission via interface 150), system 110 can select a cluster from clusters 144 associated with the selected semantic element of source image 104. System 110 can use an enhanced GAN 116 (e.g., StyleGAN) to synthesize an output image 106 by transferring the style of the selected semantic element from source image 104 to target image 102 based on the feature information in the cluster corresponding to the selected semantic element. By localizing the style transfer, system 110 facilitates localized editing in image synthesis. System 110 can then display output image 106 in interface 150.

Figure 1B:
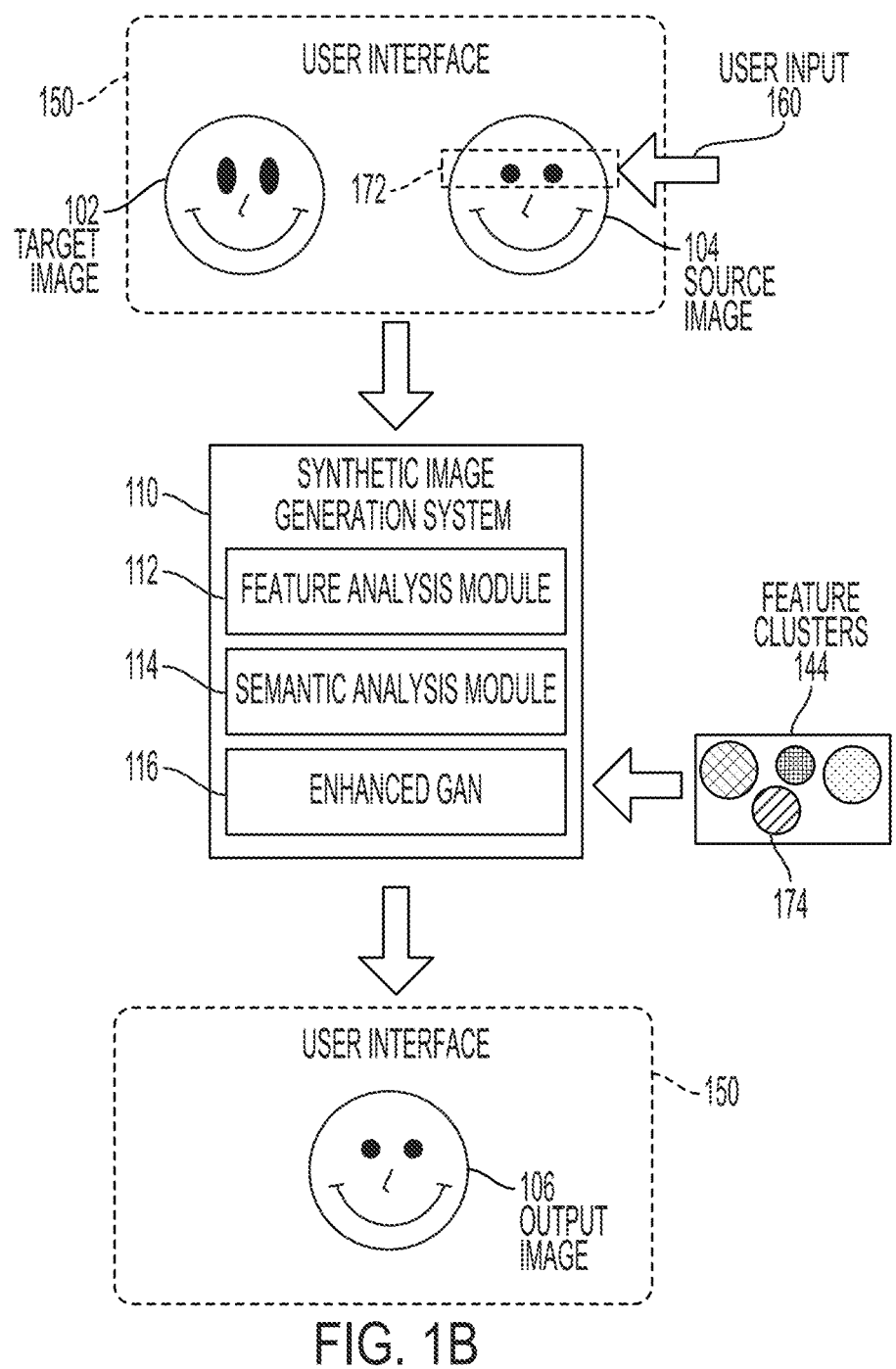
FIG. 1B illustrates exemplary localized editing for a synthetic image generation process, in accordance with an embodiment of the present application.

FIG. 1B illustrates exemplary localized editing for a synthetic image generation process, in accordance with an embodiment of the present application. Suppose that user input 160 selects a semantic element 172 from source image 104. If source image 104 depicts a face, semantic element 170 may correspond to the eyes of the face. Since clusters 144 represent corresponding semantic elements, such as eyes, nose, and mouth, of source image 104, system 110 can select a cluster 174 corresponding to semantic element 172 of source image 104. System 110 can obtain the selection from interface 150 (e.g., either from the click or from a feature catalog) and determine the corresponding cluster 174 in clusters 144.

GAN 116 can synthesize output image 106 by transferring the style of the selected semantic element 172 from source image 104 to target image 102 based on feature information in cluster 174 associated with selected semantic element. GAN 116 can be trained to synthesize an image by transferring styles from source image 104 to target image 102. For example, if GAN 116 is based on StyleGAN, the generator neural network of GAN 116 can learn representations that are spatially disentangled with respect to semantic elements of source image 104. In other words, GAN 116's latent representations spatially disentangle semantic elements in source image 104. Consequently, embeddings corresponding to different elements in source image 104 represent distinct and consistent feature spaces. System 110 can utilize the embeddings of the selected semantic element to dictate the style interpolation to target image 102.

System 110 can localize the style transfer to selected semantic element 172 of source image 104 by providing the information represented cluster 174 (i.e., in the corresponding embedding). Consequently, the synthesis process of GAN 116 transfers styles represented primarily in the selected area indicated by semantic element 172 of source image 104 and generates corresponding synthetic output image 106. The locality of style transfer may depend on the extent to which semantic element 172 is disentangled from other elements in source image 104. Since GAN 116's latent representations can be significantly disentangled, system 110 can facilitate a seamless transition from unedited elements in target image 102 to the edited elements in output image 106. In this example, the eyes of the face depicted in source image 104 can be seamlessly integrated with the face depicted in target image 102. In this way, by incorporating the localized information during the synthesis process, system 110 facilitates localized editing in image synthesis without any external supervision or complex spatial operations to define the edit region.

Semantic Structure

Figure 2:
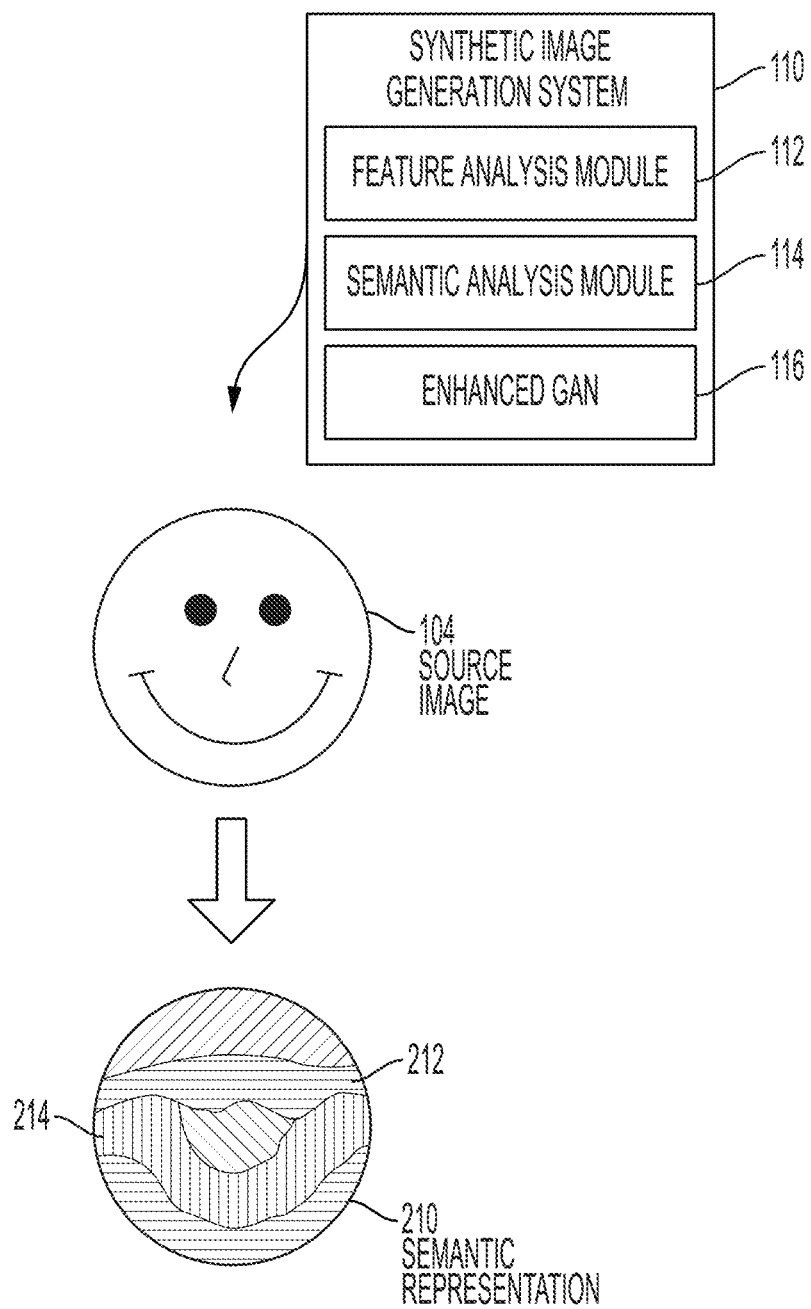
FIG. 2 illustrates exemplary clusters representing semantically meaningful elements of an image, in accordance with an embodiment of the present application.

FIG. 2 illustrates exemplary clusters representing semantically meaningful elements of an image, in accordance with an embodiment of the present application. Deep feature factorization (DFF) indicates that the learnings of an AI model (e.g., a convolutional neural network (CNN)) can be represented by factorizing a matrix of hidden layer activations. The factorization can be represented in a set of saliency maps. Such factorization indicates that an AI model trained for image classification may learn features that act as a semantic element detector for the images.

Similarly, if source image 104 is a synthetic image generated by GAN 116, feature analysis module 112 can obtain the embeddings learned by GAN 116 during the image synthesis process to demonstrate similar features. Semantic analysis module 114 can cluster the activation vectors of the synthesis process of image 104 by applying a clustering technique (e.g., spherical k-means clustering) to the activation vectors. Semantic analysis module 114 then generates a semantic representation 210 that represents the clusters. In some embodiments, the activation vectors are C-dimensional activation vectors that correspond to activation tensors at various layers of the generator networks of GAN 116. As shown in semantic representation 210, the resulting clusters spatially span coherent semantic objects, such as eyes, nose, mouth, and chin corresponding to the face depicted in source image 104. For example, clusters 212 and 214 can correspond to the eyes and mouth.

Semantic representation 210 indicates that the generator network of GAN 116 may learn representations that are spatially disentangled with respect to the semantic elements of the face depicted in source image 104. In other words, different semantic elements are embedded in a distinct and consistent feature space and can be transferred independently. As a result, if a user wishes to transfer the eyes of the face depicted in source image 104, system 110 can incorporate the information in cluster 212 in the synthesis process of GAN 116. Consequently, the eyes of the face depicted in source image 104 can be seamlessly integrated with a face depicted in a target image.

Enhanced GAN Architecture

Figure 3:
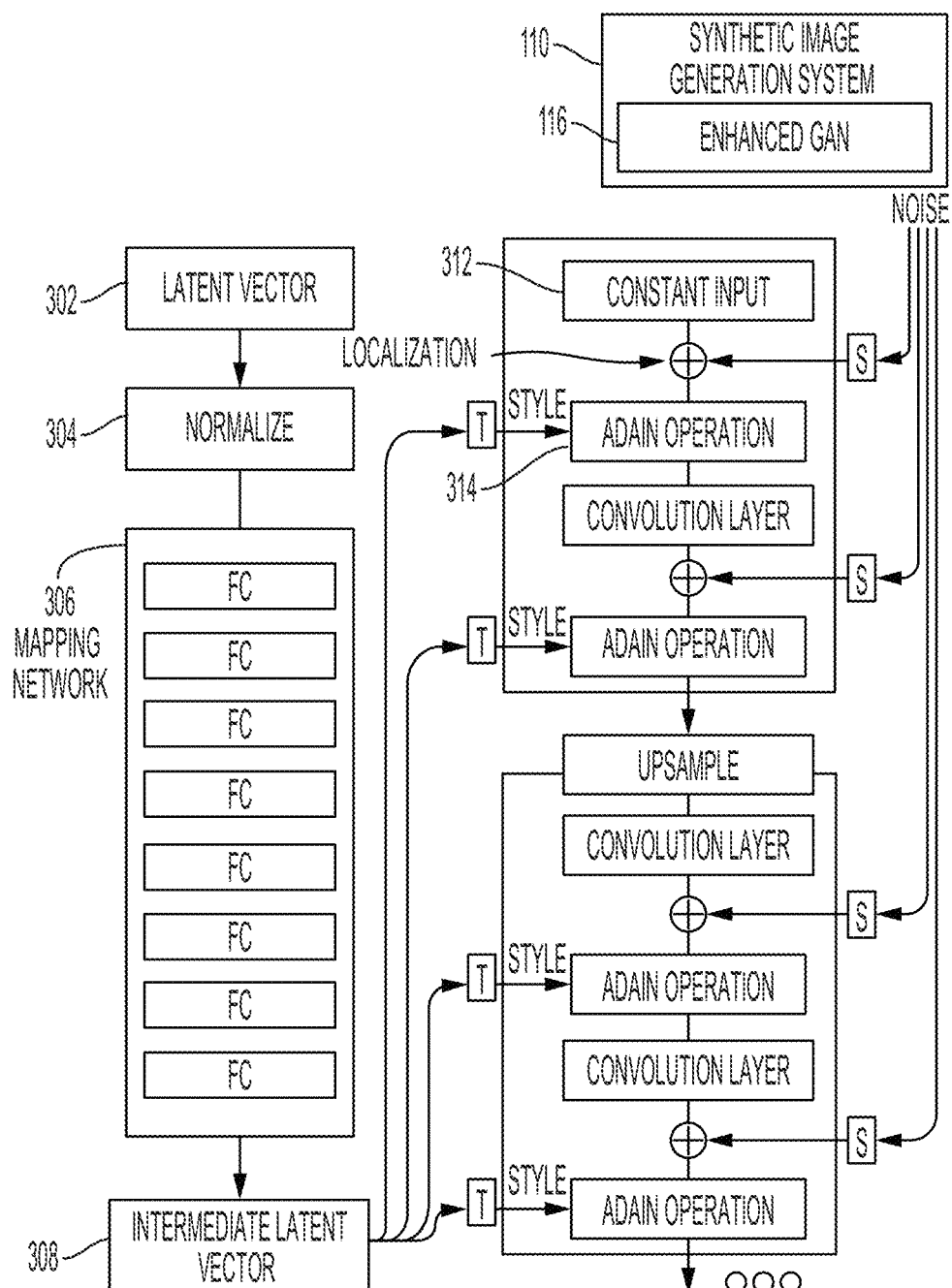
FIG. 3 illustrates an exemplary enhanced GAN for generating a synthetic image with localized editing, in accordance with an embodiment of the present application.

FIG. 3 illustrates an exemplary enhanced GAN for generating a synthetic image with localized editing, in accordance with an embodiment of the present application. During operation, GAN 116 (e.g., StyleGAN) randomly samples a latent vector 302, which can be referred to as z, from a sampling space $\mathbb{Z}$. Subsequently, GAN 116 transforms z to an intermediate latent vector 308, which can be referred to as $w \in W$. GAN 116 can perform the transformation operation based on a normalization operation 304 and a mapping network 306. The generator network of GAN 116 can be a convolutional neural network that incorporates a constant input 312 (e.g., a learned constant image).

Vector w can access the generator network via a per-layer style, $y=(y_s, y_b)=S(w)$, where S can be a learned affine transformation and the two sub-vectors $[y_s, y_b]$ are used to perform the scale and shift operations, respectively. Suppose that $X'' \in \mathbb{R}^{(C \times H \times W)}$ is the feature maps produced by a convolution operation at some given layer. The styled feature map $X_c$ for a respective channel c can be produced from $X''$ and y using an adaptive instance normalization (AdaIN) operation 314. Here, $X_c = AdaIN(X''_c, y) = y_{s,c} X'_c + y_{b,c}$, where $X'_c$ can be expressed as $$\frac{X''_c - \mu(X''_c)}{\sigma(X''_c)}.$$

Each channel $1 \le c \le C$ can be normalized over all its spatial positions to create X', which is then scaled and shifted based on style y.

Using GAN 116, system 110 can transfer a selected semantic element from a source image to a target image. Suppose that $y^{(s)}$ and $y^{(t)}$ are two styles of the same layer corresponding to two different seeds $z^{(s)}$ and $z^{(t)}$ that produce the source and target images, respectively. For image synthesis, they correspond to two different identities that may vary locally and/or globally. System 110 may gradually transfer the style from source image (denoted with an "S") to a target image (denoted with a "T") based on linear interpolation between the style vectors $y^{(s)}$ and $y^{(t)}$ by updating $y^{(\lambda)} = y^{(t)} + \lambda(y^{(s)} - y^{(t)})$ for an appropriate interpolation parameter $\lambda$.

However, such an update operation can result in transferring all style properties of $y^{(s)}$ onto $y^{(\lambda)}$. As a result, all corresponding style properties of $y^{(t)}$ become morphed. To enable selective local editing, system 110 can control the style interpolation with a matrix transformation: $y^{(\lambda)} = y^{(t)} + Q(y^{(s)} - y^{(t)})$. Here, matrix Q is positive semi-definite and chosen such that the changes in $y^{(\lambda)}$ are local in $y^{(t)}$. In other words, matrix Q is chosen such that $y^{(\lambda)}$ effects a local style transfer from $y^{(s)}$ to $y^{(t)}$. Matrix Q can be a diagonal matrix whose elements form $q \in [0,1]^C$ and can be referred to as a query matrix. In the example in FIG. 1B, local semantic editing is performed by interpolation between source and target styles on an element-specific (e.g., semantic element 172 representing the eyes of source image 104) query matrix. In contrast, global interpolation transfers eyes, nose, and mouth from source image 104.

All variations in the output of the generator network are determined by changes to each layer's style. To edit GAN 116's output, system 110 manipulates y (or its upstream "ancestors" w or z). Consequently, system 110 determines a q such that the dimensions of y are relevant to the selected semantic element and has relatively low relevance to the rest of the elements in a source image. Since the style y is applied globally (e.g., at all spatial positions), all spatial differentiation between the elements in the source image is encoded in the normalized feature map X'. Suppose that $x' \in \mathbb{R}^C$ is an embedding representing a semantic element in a source image. x' may represent a sample drawn from an appropriate spatial position of X' where the query object (i.e., the selected semantic element).

It should be noted that, with respect to scale vector $y_s$, entries of x' indicate which entries in $y_s$ may affect the selected semantic element. Entries in x' with small absolute value can stay small even when scaled while entries with large absolute value are significantly affected by scaling. Consequently, system 110 may not change vector $y_s$ to ensure that the entries of q are proportional to |x'|. Accordingly, if system 110 determines Q as a diagonal matrix with entries proportional to the absolute value of x' and all zeros for the offset term $y_s$, the resultant conditioned interpolation can affect only those entries in $y^{(\lambda)}$ that have a significant impact on the part represented by x.

In addition, to determine which entries in $y_s$ have unique attribution to the semantic element, system 110 can assign a weight $h_c$ to the c-th dimension. In some embodiments, system 110 can determine $h_c$ based on Hoyer sparsity measured over the matrix $V \in \mathbb{R}^{K \times C}$ of K centroids emerging from the spherical k-means clustering. System 110 can compute $h_c$ with respect to the activations of a large batch of samples as $$\frac{\sqrt{K} - \|V_{.,c}\|_1 / \|V_{.,c}\|_2}{\sqrt{K} - 1}.$$

System 110 may normalize this measure such that $h_c$ is 1 when the corresponding activation affects one unique semantic element in the source image and $h_c$ is 0 when the corresponding activation affects all semantic elements. Hence, system 110 determines $h_c$ such that the dimensions associated with the selected semantic element exert a stronger influence in directing style interpolation.

Based on the element-specific vector x' and dimension selectivity weighting h, system 110 can determine a respective $q_c$ of q as $\min(1, \lambda h_c {x'}_c^2)$, where λ is used as in standard interpolation to determine the strength of the transfer. It should be noted that the degree or strength of transfer indicated by degree selector 156 in FIG. 1A may correspond to parameter λ. A lower value of λ can facilitate the transfer of the selected element, and a higher value of λ may indicate a more global transfer. When the interpolation parameter λ is set high enough such that the weight of each channel is 1, the result is a global transfer at that layer. By determining $q_c = \min(1, \lambda h_c {x'}_c^2)$, system 110 utilizes the unique correspondence between feature activation and the corresponding semantic element to facilitate localized editing. This process does not rely on an explicit spatial function to dictate the localization of the editing process.

Figure 4A:
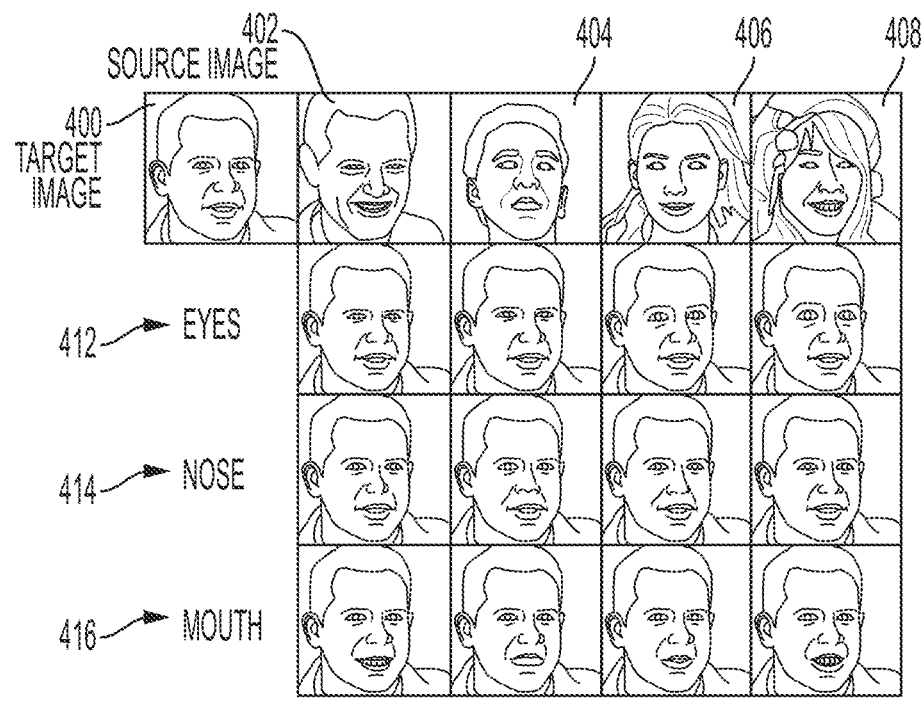
FIG. 4A illustrates exemplary synthetic images generated based on localized editing, in accordance with an embodiment of the present application.

FIG. 4A illustrates exemplary synthetic images generated based on localized editing, in accordance with an embodiment of the present application. In this example, different semantic elements are transferred from source images 402, 404, 406, and 408 to a target image 400. Rows 412, 414, and 416 correspond to the transfer of eyes, nose, and mouth, respectively, from 402, 404, 406, and 408 to target image 400. The respective semantic elements are seamlessly transferred without significant modification to the rest of target image 400. In this way, the local transfer of semantic elements can facilitate localized editing during image synthesis.

Figure 4B:
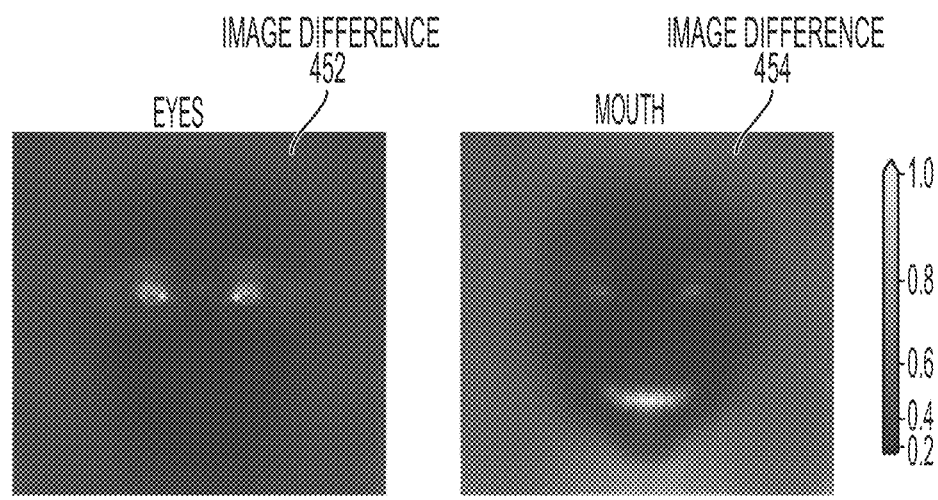
FIG. 4B illustrates exemplary image differences indicating localization of edits, in accordance with an embodiment of the present application.

FIG. 4B illustrates exemplary image differences, which is between target images and the corresponding output images, indicating localization of edits, in accordance with an embodiment of the present application. Image differences 452 and 454 show the average pixel-wise image difference computed over 50 thousand pairs of edited and original target images. The edited images are generated based on localized editing. Image differences 452 and 454 depict the image differences of images that have been locally edited for eyes and mouth, respectively. Image differences 452 and 454 demonstrate that localized editing during image synthesis can be effective.

The localized editing does not require an explicit spatial localization operation (e.g., spatial attention or a weight map) in the actual editing process. Furthermore, such localized editing does not rely on an external form of supervision (e.g., semantic part segmentation). Instead, the localization is accomplished by utilizing the inherent structure in the embeddings of the hidden layers of an enhanced GAN that naturally align with semantic elements of images.

Operations

Figure 5A:
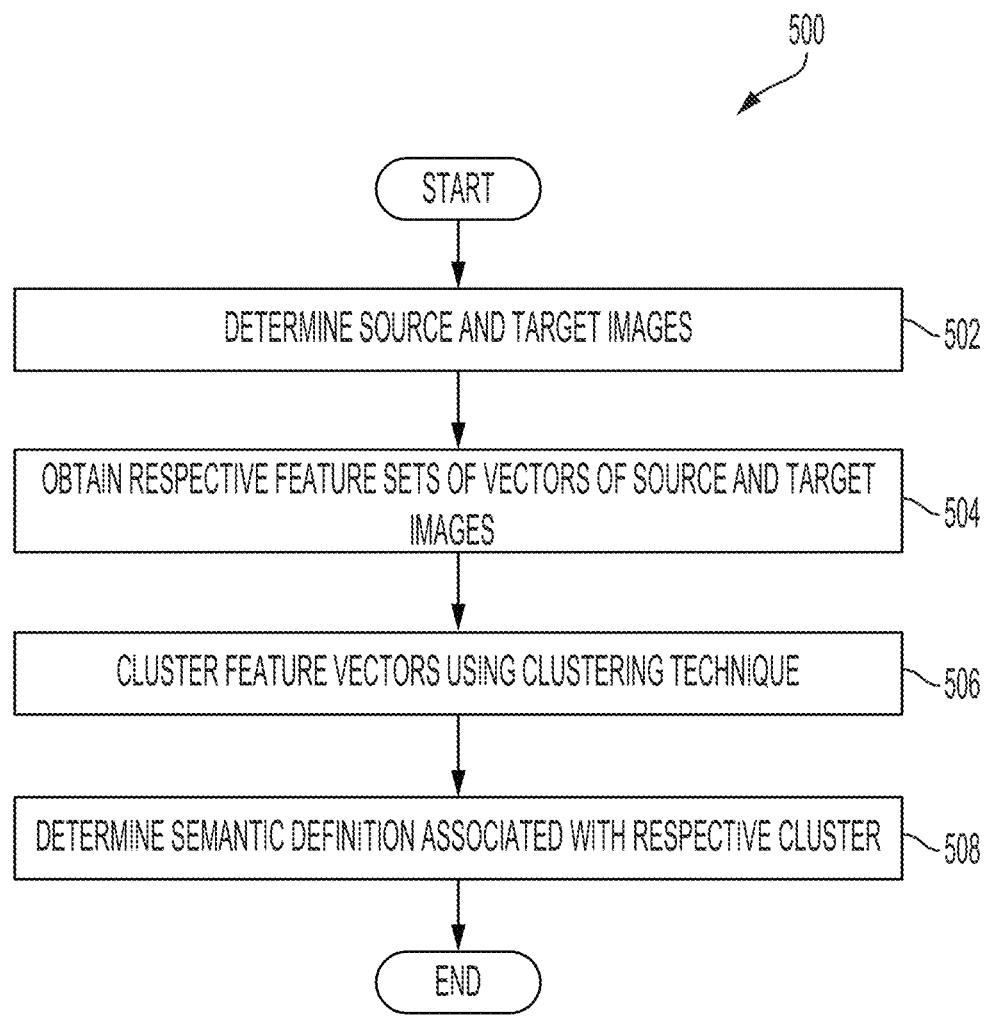
FIG. 5A presents a flowchart illustrating a method of a synthetic image generation system clustering image features for representing semantic elements in an image, in accordance with an embodiment of the present application.

FIG. 5A presents a flowchart 500 illustrating a method of a synthetic image generation system clustering image features for representing semantic elements in an image, in accordance with an embodiment of the present application. During operation, the system determines (i.e., receives) the source and target images (operation 502). The system then obtains respective sets of feature vectors of source and target images (operation 504). In some embodiments, the feature vectors are embeddings (e.g., the activations) of hidden layers of a GAN. The system then clusters the feature vectors using a clustering technique (operation 506). If the system uses k-means clustering, the system may generate k clusters (or centroids). The system then determines a semantic definition associated with a respective cluster (operation 508). A user may label a respective cluster to facilitate the semantic definition of the cluster.

Figure 5B:
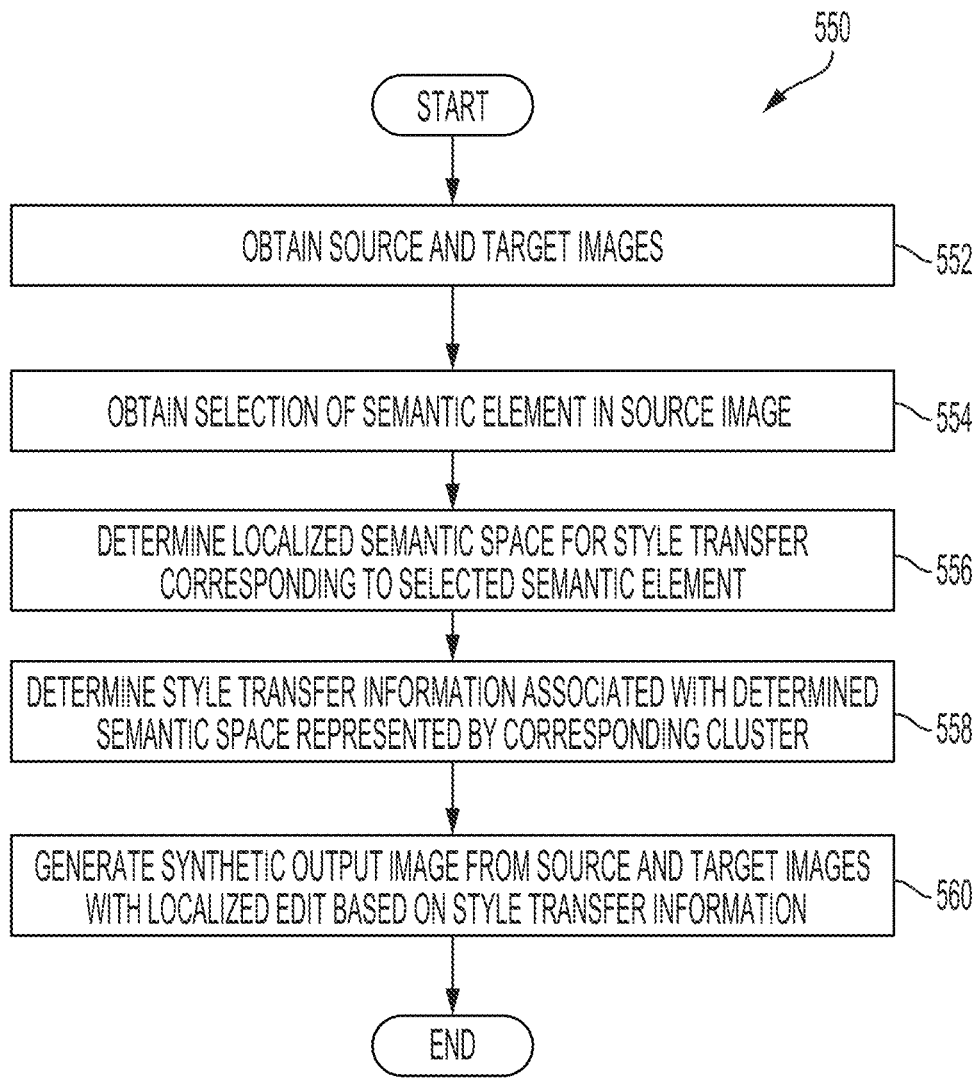
FIG. 5B presents a flowchart illustrating a method of a synthetic image generation system generating a synthetic image with localized edits, in accordance with an embodiment of the present application.

FIG. 5B presents a flowchart 550 illustrating a method of a synthetic image generation system generating a synthetic image with localized edits, in accordance with an embodiment of the present application. During operation, the system obtains source and target images (operation 552) and obtains a selection of a semantic element in the source image (operation 554). The system then determines the localized semantic space for style transfer corresponding to the selected semantic element (operation 556). Subsequently, the system determines style transfer information associated with the determined semantic space represented by the corresponding cluster (operation 558). The system then generates a synthetic output image from the source and target images with localized edits based on the style transfer information (operation 560). In the example in FIG. 3, the style transfer information can be determined based on $q_c=\min(1,\lambda h_c x'^2_c)$.

Figure 6:
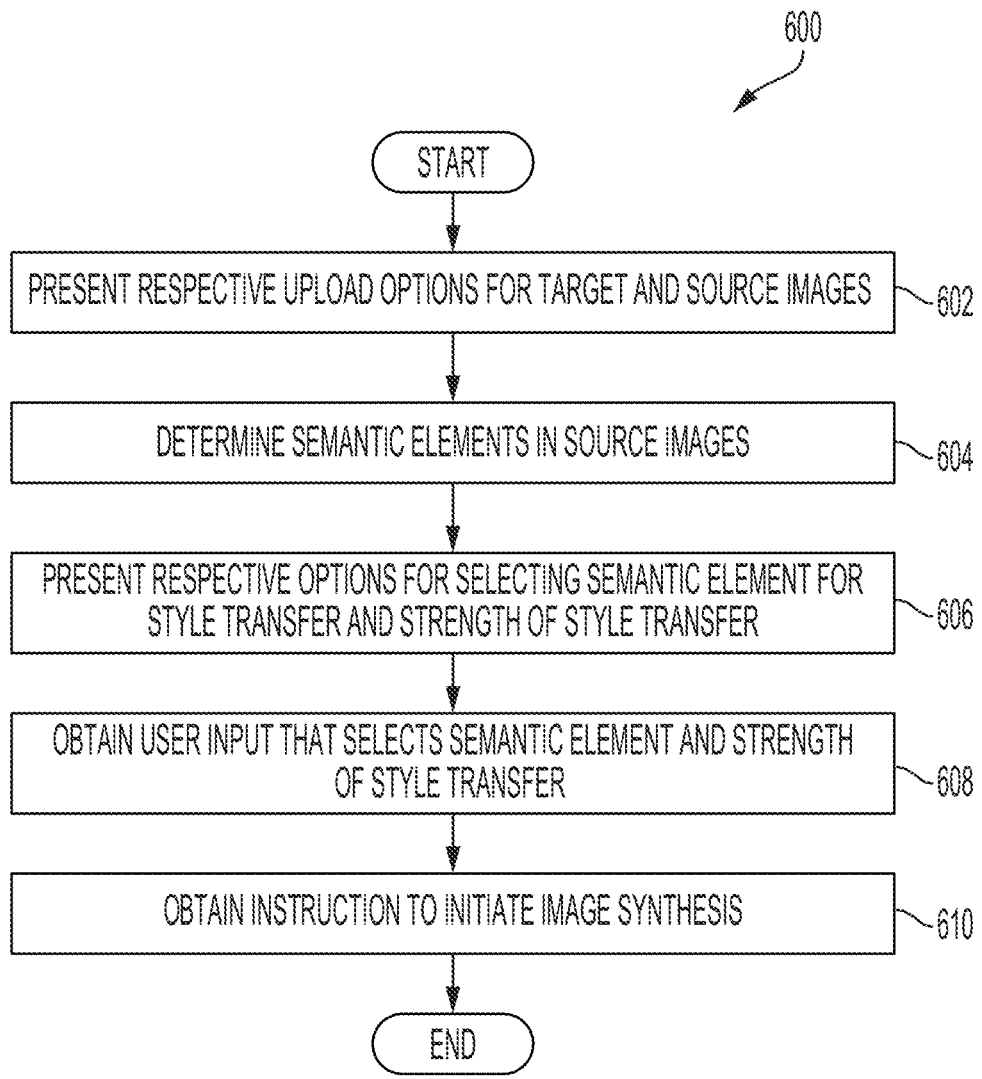
FIG. 6 presents a flowchart illustrating a method of a user interface of a synthetic image generation system facilitating synthetic image generation with localized edits, in accordance with an embodiment of the present application.

FIG. 6 presents a flowchart 600 illustrating a method of a user interface of a synthetic image generation system facilitating synthetic image generation with localized edits, in accordance with an embodiment of the present application. During operation, the interface presents respective upload options for target and source images (operation 602). The interface then determines the semantic elements in the source image (operation 604). The interface may use a pre-populated catalog of semantic elements for the image type of the source image. The interface then presents respective options for selecting a semantic element for style transfer and a strength of the style transfer (operation 606). The interface then obtains a user input that selects a semantic element and a strength of the style transfer (operation 608), and obtains an instruction (e.g., a submission) to initiate the image synthesis (operation 610).

Exemplary Computer System and Apparatus

Figure 7:
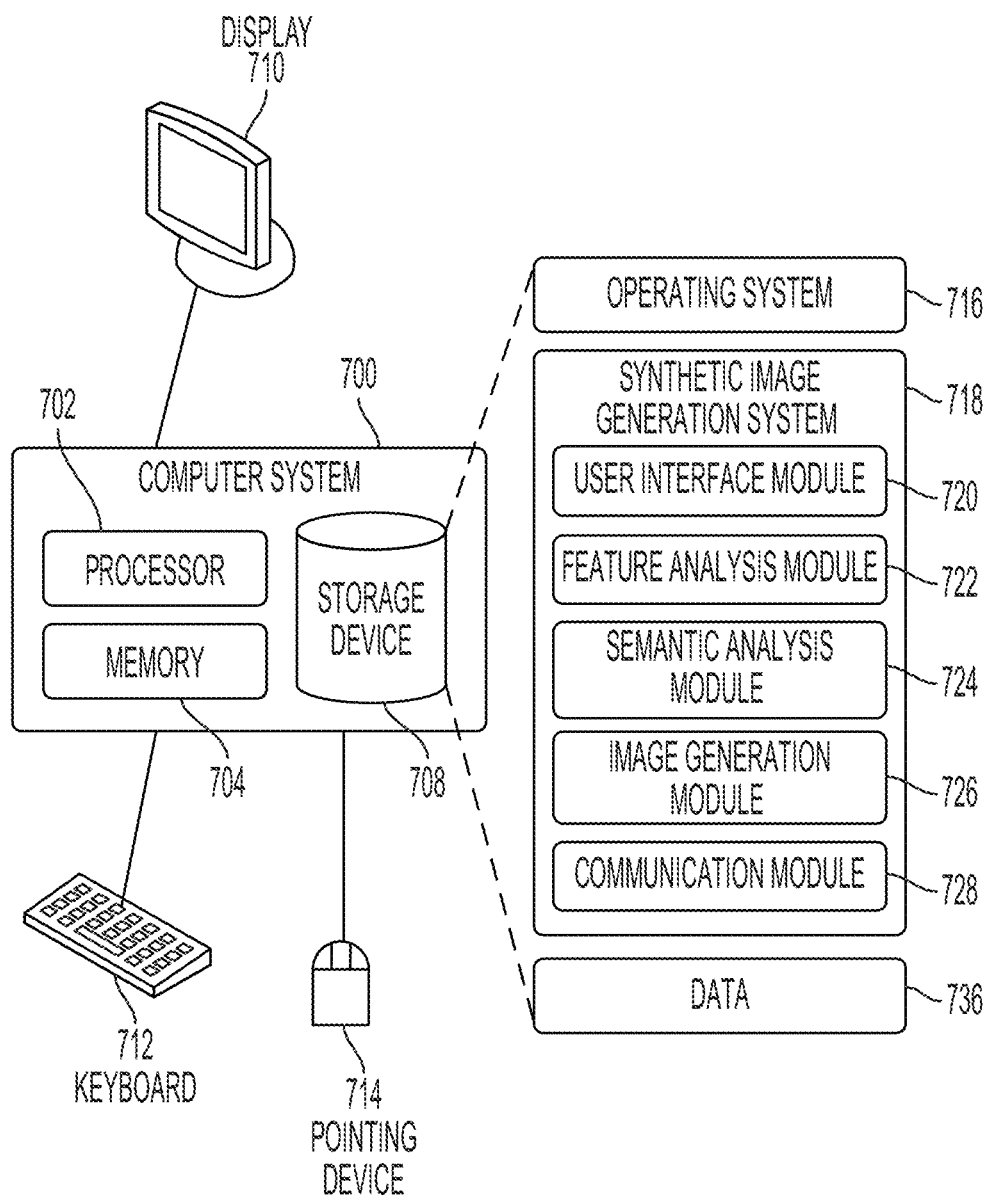
FIG. 7 illustrates an exemplary computer system that facilitates synthetic image generation with localized edits, in accordance with an embodiment of the present application.

FIG. 7 illustrates an exemplary computer system that facilitates synthetic image generation based on semantic information, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a synthetic image generation system 718, and data 736. Synthetic image generation system 718 can incorporate the operations of system 110.

Synthetic image generation system 718 can include instructions, which when executed by computer system 700 can cause computer system 700 to perform methods and/or processes described in this disclosure. Specifically, synthetic image generation system 718 can include instructions for providing a user interface that allows a user to select the source and target images, and a semantic element in the source image (user interface module 720). Synthetic image generation system 718 can also include instructions for determining feature vectors associated with the source and/or target images (feature analysis module 722). Furthermore, synthetic image generation system 718 includes instructions for clustering the feature vectors using a clustering technique and allocating semantic labels to a respective cluster (semantic analysis module 724).

Synthetic image generation system 718 can also include instructions for generating a synthetic output image based on the source and target images with local editing associated with the selected semantic element (image generation module 726). Synthetic image generation system 718 may further include instructions for sending and receiving messages (communication module 728). Data 736 can include any data that can facilitate the operations of one or more of: feature analysis module 112, semantic analysis module 114, and enhanced GAN 116. Data 736 may include one or more of: image samples, feature vectors, clusters of feature vectors, an association between a cluster and the corresponding semantic element, query matrices, and synthetic output images.

Figure 8:
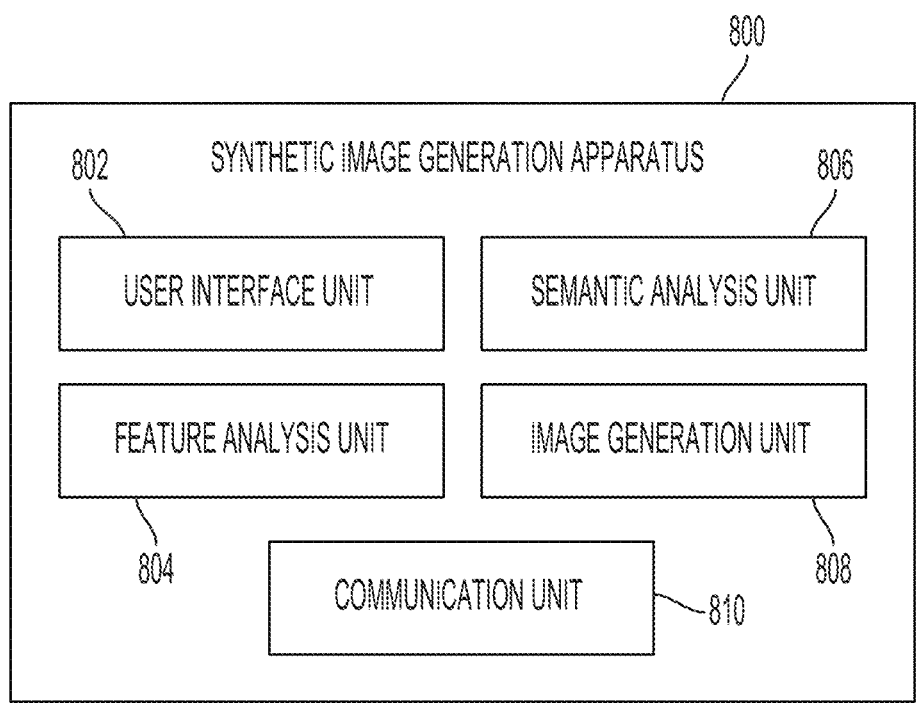
FIG. 8 illustrates an exemplary apparatus that facilitates synthetic image generation with localized edits, in accordance with an embodiment of the present application.

FIG. 8 illustrates an exemplary apparatus that facilitates synthetic image generation based on semantic information, in accordance with an embodiment of the present application. Synthetic image generation apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-810, which perform functions or operations similar to modules 720-728 of computer system 700 of FIG. 7, including: a user interface unit 802; a feature analysis unit 804; a semantic analysis unit 806; an image generation unit 808; and a communication unit 810.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for generating synthetic images with localized editing, comprising:
   obtaining a source image and a target image as inputs for image synthesis;
   extracting, by applying a first Artificial Intelligence (AI) model, respective feature vectors from the source and target images;
   selecting a semantic element from the source image, wherein the semantic element indicates a semantically meaningful part of an object depicted in the source image;
   determining respective style information associated with the source and target images;
   determining a style of the semantic element from the style information localized at the semantic element; and
   generating, using a second AI model, a synthetic image by transferring the style of the selected semantic element from the source image to the target image based on the feature vectors, thereby facilitating the localized editing of the target image.

2. The method of claim 1, further comprising:
obtaining a strength of the transfer of the style of the semantic element; and
transferring the style of the semantic element based on the strength.

3. The method of claim 1, wherein the second AI model includes a generative adversarial network (GAN), and wherein the GAN includes a StyleGAN.

4. The method of claim 1, further comprising:
obtaining corresponding embeddings from one or more layers of the first AI model as the feature vectors associated with the source and target images; and
generating a set of clusters based on the feature vectors, wherein a respective cluster corresponds to a semantic element of the source image.

5. The method of claim 4, wherein the set of clusters are generated based on one or more of: K-means clustering, spherical K-means clustering, and non-negative matrix factorization.

6. The method of claim 1, wherein the first AI-model includes a StyleGAN, wherein the source and target images are synthetic images generated by the StyleGAN, and wherein the feature vectors correspond to the embeddings of one or more hidden layers of the StyleGAN.

7. The method of claim 1, wherein the source and target images are natural images; and
wherein the method further comprises converting the source and target images to respective StyleGAN representations.

8. The method of claim 1, wherein transferring the semantic element further comprises suppressing transfer of styles outside of the semantic element from the source image.

9. The method of claim 1, wherein transferring the style of the semantic element further comprises performing style interpolation between the source image and the target image based on a localizing condition matrix associated with the semantic element.

10. The method of claim 1, further comprising presenting a user interface capable of obtaining a user input that selects the semantic element from the source image, wherein the user interface is configured to obtain the user input based on one or more of: a selection of a spatial location of the semantic element on the source image and a selection from a catalog of semantic elements.

11. A non-transitory computer-readable storage medium storing instructions that when executed by a computer cause the computer to perform a method for generating synthetic images with localized editing, the method comprising:
obtaining a source image and a target image as inputs for image synthesis;
extracting, by applying a first Artificial Intelligence (AI) model, respective feature vectors from the source and target images;
selecting a semantic element from the source image, wherein the semantic element indicates a semantically meaningful part of an object depicted in the source image;
determining respective style information associated with the source and target images;
determining a style of the semantic element from the style information localized at the semantic element; and
generating, using a second AI model, a synthetic image by transferring the style of the selected semantic element from the source image to the target image based on the feature vectors, thereby facilitating the localized editing of the target image.

12. The computer-readable storage medium of claim 11, wherein the method further comprises:
obtaining a strength of the transfer of the style of the semantic element; and
transferring the style of the semantic element based on the strength.

13. The computer-readable storage medium of claim 11, wherein the second AI model includes a generative adversarial network (GAN), and wherein the GAN includes a StyleGAN.

14. The computer-readable storage medium of claim 11, wherein the method further comprises:
obtaining corresponding embeddings from one or more layers of the first AI model as the feature vectors associated with the source and target images; and
generating a set of clusters based on the feature vectors, wherein a respective cluster corresponds to a semantic element of the source image.

15. The computer-readable storage medium of claim 14, wherein the set of clusters are generated based on one or more of: K-means clustering, spherical K-means clustering, and non-negative matrix factorization.

16. The computer-readable storage medium of claim 11, wherein the first AI-model includes a StyleGAN, wherein the source and target images are synthetic images generated by the StyleGAN, and wherein the feature vectors correspond to the embeddings of one or more hidden layers of the StyleGAN.

17. The computer-readable storage medium of claim 14, wherein the source and target images are natural images; and
wherein the method further comprises converting the source and target images to respective StyleGAN representations.

18. The computer-readable storage medium of claim 11, wherein transferring the semantic element further comprises suppressing transfer of styles outside of the semantic element from the source image.

19. The computer-readable storage medium of claim 11, wherein transferring the style of the semantic element further comprises performing style interpolation between the source image and the target image based on a localizing condition matrix associated with the semantic element.

20. The computer-readable storage medium of claim 11, wherein the method further comprises presenting a user interface capable of obtaining a user input that selects the semantic element from the source image, wherein the user interface is configured to obtain the user input based on one or more of: a selection of a spatial location of the semantic element on the source image and a selection from a catalog of semantic elements.

* * * * *